May 17, 1932. H. M. BURKEY ET AL 1,858,236
METHOD OF RECOVERING COPPER
Filed Aug. 19, 1930
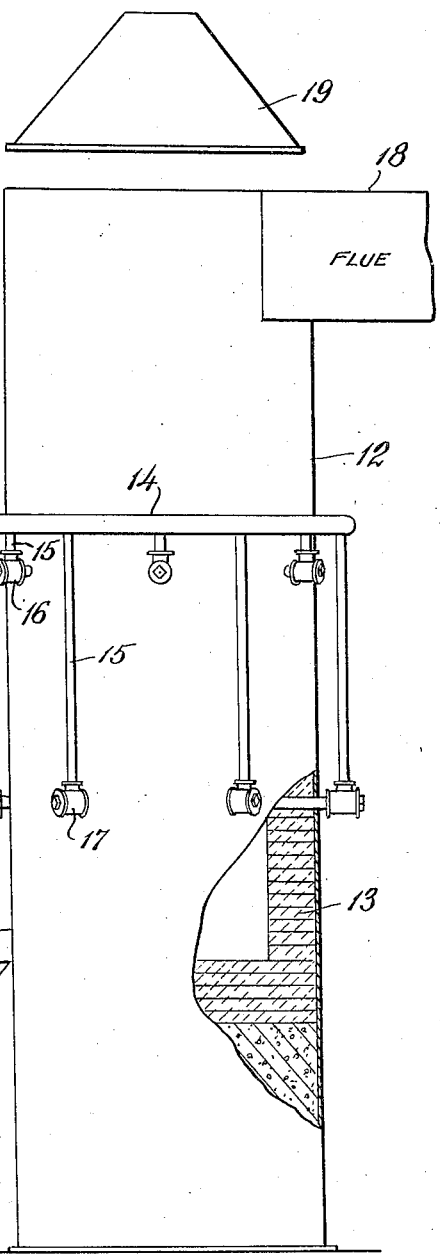
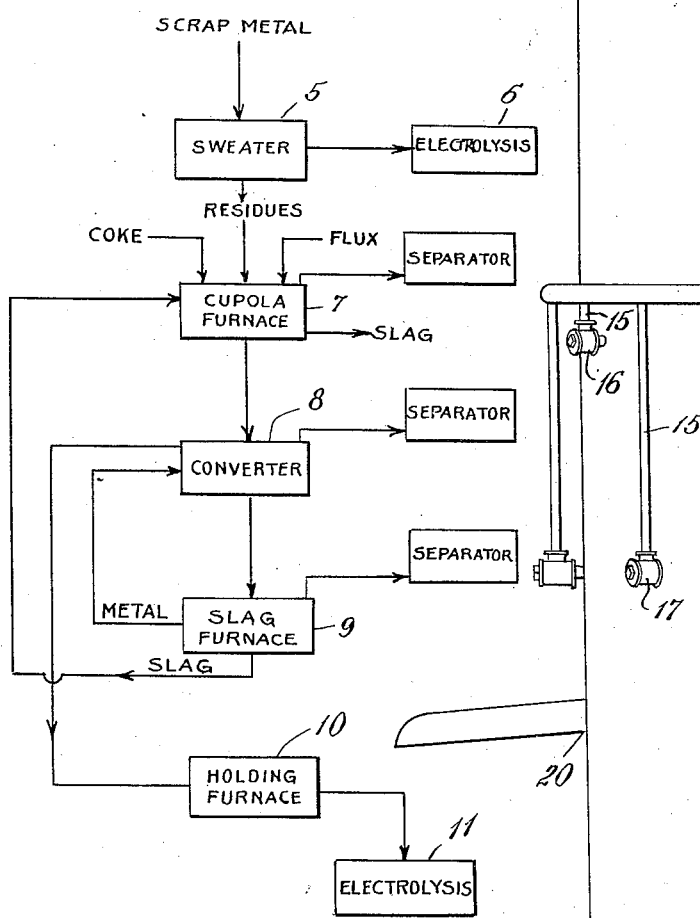
INVENTOR
Harvey M. Burkey and
BY Lawrence E. Cole
Pennie Davis Marvin & Edmonds
ATTORNEYS Patented May 17, 1932

1,858,236

UNITED STATES PATENT OFFICE

HARVEY M. BURKEY, OF PLAINFIELD, AND LAWRENCE E. COLE, OF RAHWAY, NEW JERSEY, ASSIGNORS TO AMERICAN METAL COMPANY, LTD., OF NEW YORK, N. Y., A CORPORATION OF NEW YORK

METHOD OF RECOVERING COPPER

Application filed August 19, 1930. Serial No. 476,340.

This invention relates to the recovery of copper and more particularly to the separation of copper from waste or scrap materials.

Large quantities of scrap materials containing metals in the form of alloys and mixtures are available in the form of secondary white metal alloys and residues from the smelting of lead and tin ores and from the refining of lead and tin and of lead-tin alloys. This material, containing alloys of lead and tin with various impurities including zinc, iron, nickel, antimony, arsenic, bismuth, sulphur, silver, gold and particularly copper which heretofore has been substantially useless is now being treated to recover lead-tin alloys, copper and other metals by the method described in the Patent of Burkey and Ogden No. 1,785,247, granted December 16, 1930.

In the application of this method, the raw material is first subjected to sweating to separate alloys of lead and tin by liquation. The residue is then smelted in a cupola furnace with the addition of suitable fluxes. The volatile metals which separate with the combustion gases are collected in a bag house or in a Cottrell precipitator and are treated subsequently to recover zinc, lead and tin. The copper is collected as black copper in the cupola and is removed therefrom to a converter in which it is blown to produce blister copper. The latter material is subsequently refined by oxidation and subsequent "poling" or otherwise and is cast into anodes for electrolytic refining. The slag from the converter which carries considerable proportions of oxidized copper, is returned to the cupola and passes again through the cycle.

It is the object of the present invention to effect a further improvement and saving in the recovery of copper from copper-containing materials and more especially in that part of the method hereinbefore described involving the recovery of the copper.

In carrying out the invention, the slag from the converter in which the black copper is converted into blister copper is delivered to a slag furnace in which it is caused to flow through a bed of incandescent fuel such as coke. If the slag is viscous or sticky, a small amount of a suitable flux such as calcium fluoride can be added to make the slag more fluid and thus facilitate the operation. The oxidized copper in the slag is reduced and settles from the slag when the latter is withdrawn from the furnace. An appreciable amount of lead, tin and zinc oxides in the slag is also separated as fume and can be collected in a bag house or Cottrell precipitator. The separated metal, principally copper, is returned directly to the converter and joins the blister copper produced therein. The remaining slag from the furnace is returned to the cupola. The blister copper from the converter may be refined, in the usual manner, and may be cast into anodes and subjected to further refining by the electrolytic process.

In spite of the additional coke or other carbonaceous fuel which is consumed in the operation of the slag furnace, the method is economical and in fact effects a substantial saving in the recovery of the copper. In the cupola furnace approximately 8% by weight of coke is required to smelt the raw material, and the slag returned to that furnace requires a corresponding consumption of coke. The slag furnace can be operated on the basis of approximately 4% by weight of coke and the greater part of the copper, amounting roughly to 50% of the slag, is recovered in the slag furnace. The recovery of copper from the slag is effected, therefore, with only half as much coke as would be required in the cupola furnace, and the amount of slag returned to the cupola furnace is reduced by about 50%, so that the amount of coke supplied to the cupola furnace is correspondingly reduced. The net saving amply covers the initial cost and the upkeep of the slag furnace and leaves a substantial balance in favor of the method as described.

The method will be understood more clearly by reference to the accompanying drawings, in which Fig. 1 is a diagram or flow sheet illustrating the application of the method; and Fig. 2 is an elevation partially in section of the slag furnace.

Referring to the drawings, 5 indicates a furnace or "sweater" in which the mixed alloy material is heated preliminarily to a temperature at which the tin-lead alloy is fusible and from which the alloy thus separated can be withdrawn, leaving the balance of the material containing copper, iron, zinc, etc. The tin-lead alloy is cast into anodes and is subjected to electrolysis in cells indicated at 6, which are operated in accordance with the method described in the application of Edward F. Kern, Ser. No. 335,938, filed January 29, 1929. The latter procedure forms no part of the present invention.

The residue from the sweater is delivered to a cupola furnace 7, together with suitable proportions of coke or other carbonaceous material, and a flux such as lime and, if desired, with an additional quantity of brass or other copper alloy which is free from tin-lead alloys. The cupola furnace is operated in the ordinary manner to separate a portion of the iron in the form of a slag which is withdrawn through the slag notch and discarded. Zinc, tin, lead, and a small amount of copper are separated as fume. The fume may be separated from the combustion gases in a bag house or Cottrell separator and thereafter treated as described in the application of Burkey and Ogden Ser. No. 299,672.

The partially purified metal from the cupola is delivered then to a converter 8 where it is blown with air to oxidize impurities. Iron is separated in the slag produced in the converter and some of the copper is oxidized and enters the slag. The volatilizable elements escape as fume and can be separated in a bag house or Cottrell separator. The product of this operation is blister copper and a slag containing upward to about 50% of copper.

The slag from the converter is delivered to a ladle and is carried thereby to the slag furnace 9. This furnace, hereinafter described in more detail, is a shaft having a suitable lining of firebrick or a water jacket, and is adapted to contain a deep bed of coke. It is provided with tuyères for the introduction of air, so that the coke may be brought to incandescence at suitable intervals. The coke is blown energetically just before the ladle of slag is ready for pouring and when the coke has been raised to incandescence the slag is poured through the bed of coke, the notch at the bottom of the furnace being open so that none of the slag is held. It simply percolates through the incandescent coke and runs out from the bottom of the furnace into a ladle disposed beneath the notch. In passing through the furnace the oxidized copper in the slag is reduced and the metal separates from the slag in the collecting ladle. The metal is withdrawn and is returned as soon as possible to the converter. The remaining slag is returned to the cupola furnace for further smelting.

The copper which is recovered in the slag furnace joins the blister copper in the converter, and the latter is removed to a holding furnace 10 for suitable further treatment including "poling" if desired to refine the copper. The copper now substantially free from other elements except such slight proportions as cannot be separated from smelting, etc., is cast into anodes and is subjected in the cells 11 to electrolytic refining in accordance with the usual practice. The cathodes, consisting of substantially pure copper, are then molded and cast into commercial forms.

Inasmuch as some volatile metals are separated in the slag furnace 9, the flue leading from this furnace may be connected to a bag house or Cottrell separator in which these volatile metals are separated and collected. They may be treated with the products collected from gases resulting from the operation of the cupola furnace and the converter to recover the metal contents.

In Fig. 2 of the drawings, the slag furnace is illustrated as comprising a shell 12 with a lining of firebrick 13. A bustle-pipe 14 surrounds the furnace and supplies through branch pipes 15 a plurality of tuyères 16 and 17 disposed at different levels so that the bed of coke in the furnace may be maintained at the desired temperature. The bustle-pipe is supplied with air from any suitable source. At the upper end of the furnace a flue 18 is provided to carry away the gases which are delivered to the bag house. A conical top 19 is provided on the furnace with a relatively small opening through which the slag is poured. A notch 20 at the bottom of the furnace affords an outlet for the slag.

In the operation of the slag furnace it is kept substantially full of suitable fuel such as coke, and when the slag is ready to be poured the coke is blown energetically to raise the temperature until the coke is incandescent. The blast of air is then shut down and the notch or tap hole is opened thoroughly so that the slag will not be held in the furnace. The traveling crane (not shown) then carries the ladle with the slag to the slag furnace and pours it into the opening at the top thereof. The slag passes immediately through the furnace and the separated metal and slag are returned respectively to the converter and cupola furnace. The blast in the slag furnace is then cut to half or less to save coke, and the tap hole is plugged until another charge of slag is ready.

The advantage of the method resides in the small amount of material which is returned to the cupola furnace, the circulating load being thereby reduced. As practically all of the copper is reduced in the operation, there is less expense involved in running this operation and the time required to recover the copper is also reduced. Also it permits the system to treat more raw material because of the smaller return from the secondary operation in the converter to the primary operation in the cupola furnace. The additional new material owing to the reduction in the return of slag is treated at practically no expense, and consequently there is an effective net saving in the operation.

Various changes may be made in the details of the operation and in the apparatus employed therefor without departing from the invention or sacrificing any of the advantages thereof.

We claim:

1. The method of recovering copper from copper-bearing material which comprises smelting the material, blowing the resulting black copper in a converter to produce blister copper, subjecting the slag produced in the converter to contact with incandescent carbon, thereby reducing the oxidized copper, and separating and returning the resulting metal to the converter.

2. The method of recovering copper from copper-bearing material which comprises smelting the material, blowing the resulting black copper in a converter to produce blister copper, subjecting the slag produced in the converter to contact with incandescent carbon, thereby reducing the oxidized copper, separating and returning the resulting metal to the converter, and returning the balance of the slag for re-smelting with fresh copper-bearing material.

3. The method of recovering copper from copper-bearing material which comprises smelting the material, blowing the resulting black copper in a converter to produce blister copper, pouring the slag produced in the converter through an incandescent bed of carbon, thereby reducing the oxidized copper, separating and returning the resulting metal to the converter, and returning the balance of the slag for re-smelting with fresh copper-bearing material.

4. The method of recovering copper from copper-bearing material which comprises smelting the material, blowing the resulting black copper in a converter to produce blister copper, blowing a bed of coke to incandescence, pouring the slag produced in the converter through the incandescent bed, thereby reducing the oxidized copper, separating and returning the resulting metal to the converter and returning the balance of the slag for re-smelting with fresh copper-bearing material.

5. The method of recovering copper from copper-bearing material which comprises smelting the material, blowing the resulting black copper in a converter to produce blister copper, adding a flux and subjecting the slag produced in the converter to contact with incandescent carbon, thereby reducing the oxidized copper and separating and returning the resulting metal to the converter.

6. The method of recovering copper from copper-bearing material which comprises smelting the material, blowing the resulting black copper in a converter to produce blister copper, subjecting the slag produced in the converter to contact with incandescent carbon, thereby reducing the oxidized copper, separating and returning the resulting metal to the converter, and separating the volatile metals from the fume resulting from the operation.

7. The method of recovering copper from copper-bearing material which comprises smelting the material, blowing the resulting black copper in a converter to produce blister copper, blowing a bed of coke to incandescence, adding a flux to the slag produced in the converter, pouring the slag and flux through the incandescent bed, thereby reducing the oxidized copper and returning the resulting metal to the converter and returning the balance of the slag for resmelting with fresh copper-bearing material.

In testimony whereof I affix my signature.
LAWRENCE E. COLE.

In testimony whereof I affix my signature.
HARVEY M. BURKEY.